United States Patent

Flachsbarth

[15] 3,644,760

[45] Feb. 22, 1972

[54] SWITCHING CIRCUIT FOR PULSING THE CONTROL-CURRENT OF A HALL GENERATOR

[72] Inventor: Dieter Flachsbarth, Ruckersdorf Bei, Nurnberg, Germany

[73] Assignee: Siemens Aktiengesellschaft, Berlin, Germany

[22] Filed: Apr. 7, 1970

[21] Appl. No.: 26,222

[30] Foreign Application Priority Data

Apr. 17, 1969 Germany....................P 19 19 440.2

[52] U.S. Cl...........................307/309, 307/246, 338/32 H

[51] Int. Cl...........................H01r 5/00

[58] Field of Search..........307/309, 246; 330/6; 332/51 H; 329/200; 324/45; 338/32 H

[56] References Cited

UNITED STATES PATENTS

| | | | |
|---|---|---|---|
| 3,165,685 | 1/1965 | Manteuffel et al. | 307/309 X |
| 3,226,573 | 12/1965 | Wieder | 307/309 X |
| 2,995,702 | 8/1961 | Lyon | 324/45 |
| 3,334,243 | 8/1967 | Copper | 307/246 X |

*Primary Examiner*—Donald D. Forrer
*Assistant Examiner*—B. P. Davis
*Attorney*—Curt M. Avery, Arthur E. Wilfond, Herbert L. Lerner and Daniel J. Tick

[57] ABSTRACT

A switching circuit for pulsing the control-current of a Hall generator has a switching component with two current electrodes and a control electrode as well as a Hall generator with two control-current electrodes and two voltage electrodes. One of the control-current electrodes is connected to one of the current electrodes of the switching component. A capacitor is connected between the other of the control-current electrodes and the other of the current electrodes of said switching components, whereby the capacitor discharges through the Hall generator via the two control-current electrodes and through the switching means via the two current electrodes when the switching means is turned on. A resistor has two terminals and one of the terminals is connected to the other of the current electrodes of the switching component. One of the voltage electrodes of the Hall generator and the other of the terminals of the resistor are adapted for connection to an energy source, whereby the capacitor is charged through the resistor and the impedance of the Hall generator between the other control-current electrode and the one voltage electrode.

5 Claims, 2 Drawing Figures

SWITCHING CIRCUIT FOR PULSING THE CONTROL-CURRENT OF A HALL GENERATOR

My invention relates to Hall generator circuits and in a preferred, though not exclusive, aspect to Hall generator circuits applied as magnetically responsive position indicators. With a suitable pulsing of the control-current of a Hall generator, the output voltage at the electrodes of the Hall generator can be made suitable for directly controlling without further amplification, such switching devices as thyristors, flip-flop units, or trigger circuits.

It is an object of my invention to devise a circuit for pulsing the control-current of a Hall generator in a particularly simple manner while reliably obviating the necessity of amplifying the output voltage used for triggering an electronic switching device.

According to a feature of the invention, I include in the control-current circuit of the Hall generator a capacitor which is charged through a resistor and through the impedance of the Hall generator between a current terminal, and a voltage electrode thereof. A discharge of the capacitor occurs when an electronic switch, such as a transistor or thyristor connected to the Hall generator is triggered, the discharge then passing through the transistor or thyristor and the control-current path of the Hall generator. The switching of the transistor or thyristor is preferably initiated by means of a pulse train.

Figure 1:
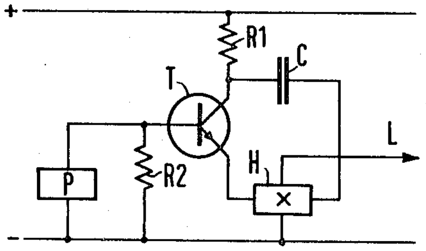
Figure 2:
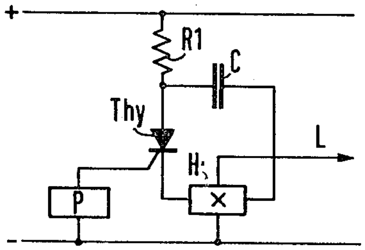

The invention will now be elucidated with reference to the accompanying drawing in which:

FIG. 1 is an electrical schematic diagram of a circuit arrangement according to the invention wherein a transistor is used with the Hall generator; and FIG. 2 is an electrical schematic diagram of a circuit arrangement according to the invention wherein a thyristor is used with the Hall generator.

Referring to FIG. 1, a capacitor C and the collector-emitter circuit of the transistor T are in the control-current circuit of Hall generator H. The collector and capacitor are connected to the positive pole of the voltage source through a resistor R1. The base of the transistor T is connected to the negative pole of a voltage source through a resistor R2. A voltage electrode of the Hall generator is also connected to the negative pole. The other voltage electrode of the Hall generator is connected to a succeeding switching stage via lead L.

When the transistor is blocked, the capacitor C is charged through resistor R1 and the impedance of the Hall generator between a current and a voltage electrode thereof. The resistor R1 is so large that the current used in switching the transistor has no significant secondary effect. When the transistor is triggered at its base, the capacitor C discharges through the Hall generator H and the transistor T in a very short time. If the transistor T is kept in the turned-on position, an additional current flows through resistor R1, the transistor T and the Hall generator H, the current having no significance with regard to the additional switching. When the transistor becomes blocked again, the capacitor C is recharged and is ready for the next input pulse to the transistor.

When using the switching arrangement with magnetic-field dependent position indicators, the transistor is pulsed by a pulse source P.

FIG. 2 illustrates the circuit arrangement of the invention wherein a thyristor is used instead of a transistor. The same parts are designated with the same reference characters as used in FIG. 1. The switching operation of the circuit corresponds to that of FIG. 1. In this connection, it is proper to select the resistor R1 so that the current flowing therethrough and charging the capacitor is less than the holding current of the thyristor; this permits the thyristor to be blocked after each pulse thereby enabling the capacitor to become recharged.

To those skilled in the art it will be obvious upon a study of this disclosure that the invention permits of various modifications and hence may be given embodiments other than illustrated and described herein, without departing from the essential features of the invention and within the scope of the claims annexed hereto.

I claim:

1. A switching circuit for pulsing the control-current of a Hall generator comprising switching means having two current electrodes and a control electrode, a Hall generator having two control-current electrodes and two voltage electrodes, one of said control-current electrodes being connected to one of said current electrodes of said switching means, a capacitor connected between the other of said control-current electrodes and the other of said current electrodes of said switching means, whereby said capacitor discharges through said Hall generator via said two control-current electrodes and through said switching means via said two current electrodes when said switching means is turned on, a resistor having two terminals, one of said terminals being connected to the other of said current electrodes of said switching means, and energy supply means connected to one of said voltage electrodes of said Hall generator and the other of said terminals of said resistor, whereby said capacitor is charged through said resistor and the impedance of said Hall generator between said other control-current electrode and said one voltage electrode.

2. In a switching circuit according to claim 1, said switching means being a transistor.

3. A switching circuit according to claim 1, wherein said switching circuit further comprises a pulse generator connected to said control electrode of said switching means for turning on the latter.

4. In a switching circuit according to claim 1, said switching means being a thyristor.

5. In a switching circuit according to claim 4, said resistor having a magnitude selected so that the current that charges said capacitor is less than the holding current of said thyristor.

* * * * *